United States Patent [19]
Baker et al.

[11] Patent Number: 5,883,883
[45] Date of Patent: Mar. 16, 1999

[54] APPARATUS AND METHOD FOR TESTING THE ADMINISTRATION OF NETWORK BASED SUPPLEMENTARY SERVICES

[75] Inventors: Albert D. Baker, Lincroft; Charles L. Davidson, Middletown; Ellen Eng, Chatham, all of N.J.

[73] Assignee: Lucent Technologies Inc., Murray Hill, N.J.

[21] Appl. No.: 731,791

[22] Filed: Oct. 18, 1996

[51] Int. Cl.[6] .................................................. H04L 12/16
[52] U.S. Cl. ........................... 370/250; 370/259; 370/522
[58] Field of Search .................................. 370/241, 250, 370/259, 271, 522

[56] References Cited

U.S. PATENT DOCUMENTS

5,535,198  7/1996  Baker et al. ............................. 370/426
5,621,731  4/1997  Dale et al. ............................... 370/385

Primary Examiner—Melvin Marcelo

[57] ABSTRACT

Whether or not the provisioning of a given BRI is properly administered is determined by providing a collection of processes which exercise the known network provided supplementary services in a predetermined fashion. Specifically, a predetermined, i.e., algorithmic, process is employed to examine an administration database to determine which DSLs are to support supplementary services and, then, the process invokes a plurality of processes which attempt to activate the expected supplementary service. The basic mode of operation is to generate a connectivity context in which the supplementary service can be invoked and, then, cause the service to be invoked. ISDN messages are transmitted to the network over the D channel of the given BRI both to establish the service context and, then, to invoke the supplemental service. By analyzing the processes and ISDN messages the system can determine if the desired supplementary services are available, and the results of the analysis are recorded and made available to an operator.

18 Claims, 11 Drawing Sheets

CPE EQUIPMENT CONFIGURATION

| SLOT ID | HID | CO/BRI |
|---------|----------|--------|
| 1 | HEX CODE | Y/N |
| ⋮ | ⋮ | ⋮ |
| N | HEX CODE | Y/N |

FIG. 3

ADMIN. SUPPLEMENTARY SERVICE DATABASE

| HID | SPID | DN | SUPPLEMENTARY SERVICE ID | SS DATA |
|-----|------|----|--------------------------|---------|
| 801 | 019574000000 | 9574000 | MULTI LINE HUNT GROUP-VOICE<br>MULTI LINE HUNT GROUP-DATA<br>⋮ | 9572000 |
| ⋮ | ⋮ | ⋮ | | ⋮ |

FIG. 4

SUPPLEMENTARY SERVICE TEST ROUTINE DATABASE

| SUPPLEMENTARY SERVICE ID | TEST ROUTINE | OUTBOUND | INBOUND | RESULT |
|---|---|---|---|---|
| MLHG-VOICE<br>MLHG-DATA<br>BASIC<br>BASIC<br>HOLD<br>... | HUNT GROUP TEST<br>VOICE (SP, 3.1 KHz)<br>DATA (64 Kbps, 56 Kpbs,...)<br>... | SETUP<br>SETUP ACKNOWLEDGE<br>CALL PROCEEDING<br>ALERTING<br>CONNECT<br>DISCONNECT<br>RELEASE<br>RELEASE COMPLETE<br>HOLD<br>RETRIEVE | SETUP<br>CALL PROCEEDING<br>ALERTING<br>CONNECT<br>CONNECT ACKNOWLEDGE<br>DISCONNECT<br>RELEASE<br>RELEASE COMPLETE<br>HOLD_ACK<br>HOLD_REJECT | PASS<br>FAIL<br>INCONCLUSIVE<br>N/A |

FIG. 5

TEST SUITES AND RESULT LOG

| HARDWARE ID (HID) | SSID | RESULT |
|---|---|---|
| | MLHG-VOICE | PASS<br>FAIL<br>INCONCLUSIVE<br>N/A |

FIG. 6
GENERALIZED TESTING PROCEDURE

FIG. 7
OPERATIONAL SEQUENCE
OF TESTING PROCEDURE

FIG. 8
USER TERMINATION PROCEDURE

FIG. 9
MULTI-LINE HUNT GROUP SUPPLEMENTARY SERVICE TEST EXECUTION

FIG. 10
EMULATED CO STATION TERMINALS CONNECTING TO EXTERNAL SWITCH

FIG. 11
EMULATOR STATES FOR MULTI-LINE HUNT SUPPLEMENTARY SERVICE TESTING

|         | CASE 1 ||| CASE 2 ||| CASE 3 ||| CASE 4 |||
|---------|------|------|------|------|------|------|------|------|------|------|------|------|
|         | ORIG | DEST | BUSY | ORIG | DEST | BUSY | ORIG | DEST | BUSY | ORIG | DEST | BUSY |
| 1005-1  | X    |      |      |      | X    |      |      | X    |      | X    |      |      |
| 1005-1a |      | X    |      | X    |      |      |      |      | X    |      |      | X    |
| ⋮       |      |      | X    |      |      | X    |      |      | X    |      |      | X    |
| 1005-Na |      |      | X    |      |      | X    | X    |      |      |      | X    |      |

FIG. 12
HOLD SUPPLEMENTARY SERVICE TEST EXECUTION

FIG. 14
DESTINATION EMULATED TERMINAL NOT PROPERLY PROVISIONED FOR MULTI-LINE HUNT GROUP

APPARATUS AND METHOD FOR TESTING THE ADMINISTRATION OF NETWORK BASED SUPPLEMENTARY SERVICES

TECHNICAL FIELD

This invention relates to communication equipment and, more particularly, to equipment for interfacing to an Integrated Services Digital Network (ISDN) digital subscriber line (DSL).

BACKGROUND OF THE INVENTION

Central offices known to provide ISDN Basic Rate Interface (BRI) access must be administered not only to define user subscribed transport services but also to provide, or deny access to service provider provided supplementary services. This is a complex operation, typically performed by an operator, and may be subject to operator error. During the administration process, the operator may manipulate many parameters, and any mis-administration may result in end-users being denied access to subscribed services, or suffering misoperation because of unexpected invocation of services which were not subscribed to by the user.

SUMMARY OF THE INVENTION

The problem with determining whether or not the provisioning of a given BRI is properly administered is overcome by providing a collection of processes which exercise the known network provided supplementary services in a predetermined fashion. Specifically, a predetermined process is employed to examine an administration database to determine which DSLs are to support supplementary services and, then, the process invokes a plurality of processes which attempt to activate the expected supplementary service. The basic mode of operation is to generate a basic connectivity context in which the supplementary service can be invoked and, then, cause the service to be invoked. ISDN message transitions are transmitted to the network over the D channel of the given BRI both to establish the service context and, then, to invoke the supplemental service. By analyzing the ISDN message flow and state transitions, the system can determine if the desired supplementary services are available, and the results of the analysis are recorded and made available to an operator.

DETAILED DESCRIPTION

Figure 1:
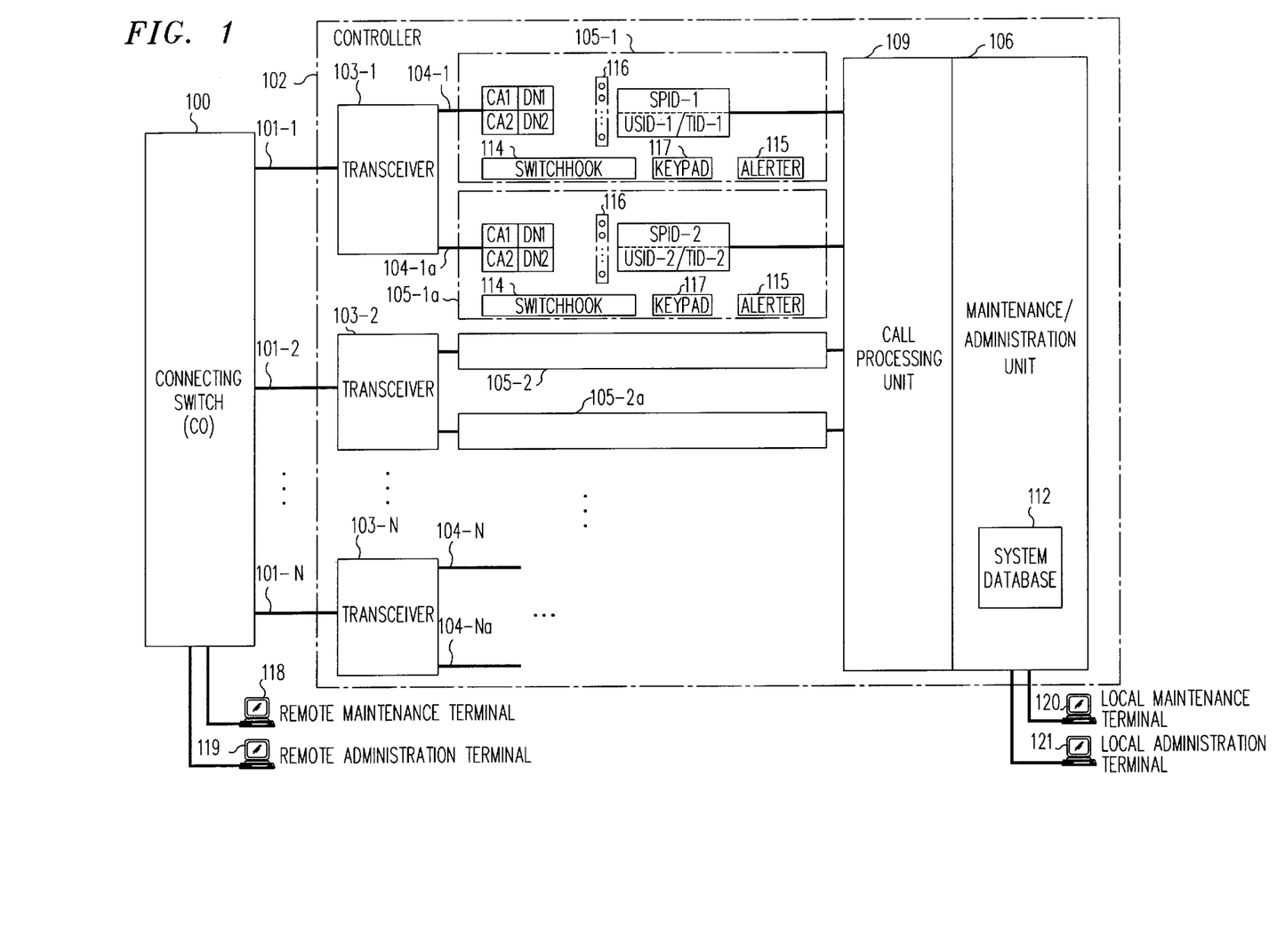
FIG. 1 shows in simplified block diagram form a system employing an embodiment of the invention.

FIG. 1 shows in simplified block diagram form, a system arrangement employing an embodiment of the invention. Shown is connecting switch, 100, which may be for example a central office (CO) switch, that is arranged to provide Centrex or other network based supplementary services, features and capabilities. However, it will be apparent that the invention may be employed with any switch (e.g., 5ESS® switch, DMS® switch, etc.) having the ISDN-BRI whether or not Centrex services are also available. It will also be apparent that the invention can be employed with any communication system that includes an interface controlled by a finite state machine having its state transitions controlled by a known message based protocol. Connecting switch 100 is connected via a plurality of digital subscriber lines 101-1 through 101-N to controller 102, which may for example, be customer premises telephone switching equipment (CPE). Controller 102 includes a similar plurality of transceivers 103-1 to 103-N for interfacing DSLs 101-1 through 101-N. In this example, transceivers 103-1 and 103-2 are U interface point transceivers and transceiver 103-N is an S/T reference point transceiver. Such transceiver arrangements are well-known in the art. Each of transceivers 103 provides an electrical connection to a corresponding one of DSLs 101 and provides the mechanism to emulate a passive bus 104. Also shown are software emulated connecting switch station terminals 105-1 and 105-1a connected via passive bus connections 104-1 and 104-1a to transceiver 103-1. Note that bus 104 is a virtual passive bus and is not a physical collection of connections but functionally provides the same result.

Each of emulated connecting switch station terminals 105-1 and 105-1a includes virtual call appearances CA-1 and CA-2, and a service profile identifier (SPID). Note CA-1 and CA-2 are supported in order to invoke and validate those supplementary services which require more than one call appearances. As will be described below, during system startup each of the emulated connecting switch station terminals 105 transmits a SPID to connecting switch 100 to identify each of emulated connecting switch station terminals 105 as a legitimate termination on the passive bus 104. That is to say, each of emulated connecting switch station terminals 105 appears as a physical ISDN BRI terminal to central office 100. Upon recognition of the SPID connecting switch 100 will transmit to emulated connecting switch station terminals 105 a user service identifier (USID) and associated terminal identifier (TID). Information from each of the emulated connecting switch station terminals 105 is supplied to and from call processing unit 109 and maintenance/administration unit 106. Included in unit 106 is system database 112. Moreover connecting switch 100 has attached thereto remote maintenance terminal 113 and remote administration terminal 114. Similarly, local maintenance terminal 115 and local administration terminal 116 are connected to controller 102 and therein to maintenance/administration unit 106. Such terminals are well known and may be of any desired type. Furthermore, each of emulated connecting switch station terminals 105 includes virtual switchhook 114, virtual alerter 115, virtual light emitting diodes (LEDs) 116 and virtual keypad 117. Virtual switchhook 114 is that which is associated with a traditional telephone instrument. In addition, signaling elements used to control an alerting device, typically included in a physical station terminal are captured by each of emulated connecting switch station terminals 105 via virtual alerter 115 and mapped to the local system data base 112. It is noted that the virtual, switchhook 114 and keypad 117 messaging operations are delivered up-link to the connecting switch 100, while the virtual CA1, CA2 and alerter 115 may be delivered down-link from connecting switch 100. Additionally, remote maintenance terminal 118 and remote administration terminal 119 are in connection with connecting switch (CO) 100. Similarly, local maintenance terminal 120 and local administration terminal 121 are in connection with controller 102 and therein maintenance/administration unit 106.

Each of emulated connecting switch station terminals 105 provides access to one or more directory numbers (DN1, DN2). Although each of emulated connecting switch station terminals 105, for example, comprised of 105-1 and 105-1*a*, are shown as supporting two (2) voice channels, it should be noted that they can support the known normative eight (8) channels, where the additional six (6) channels are packet channels. Thus, by employing the two emulated connecting switch station terminals to terminate the corresponding DSL 101, two voice channels are obtained per DSL 101 instead of just one. That is, each of emulated CO station terminals 105 provides access to one B channel of channel service. Additionally, each of emulated connecting switch station terminals 105 extracts call related and non-call related signaling from an incoming D channel signaling service and provides the extracted signaling information to controller 102. Each of emulated connecting switch station terminals 105 also supplies outgoing call related and non-call related signaling information into an outgoing D channel.

It is noted that the signaling service is transported on the BRI D channel. The signaling service includes call control related information, call typing information and call related information. Examples of call control related information are call establishment and disestablishment messages. Call typing information is exemplified by the bearer capability and high layer compatibility and low layer compatibility information elements. Call related information is typified by calling party name and calling party number information elements. It is further noted that all of these signaling service elements are well known in the art.

Note that when transceiver 103-N is an S/T transceiver, then controller 102 operates as a member terminal on a passive bus 104 connected to DSL 101-N. The S and T reference points are defined by the ISDN User-Network Interface Reference Configurations described in the ITU-T (previously "CCITT Recommendation") I.411 Standard, dated March, 1993, pages 1–7 and the U interface point is defined in American National Standard for Telecommunications (ANSI) T1.601-1992 entitled "Integrated Services Digital Network (ISDN) Basic Access Interface for Use on Metallic Loops for Application on the Network Side of the NT (Layer 1 Specification)" and approved Feb. 21, 1992 by the American National Standards Institute, Inc.

Figure 2:
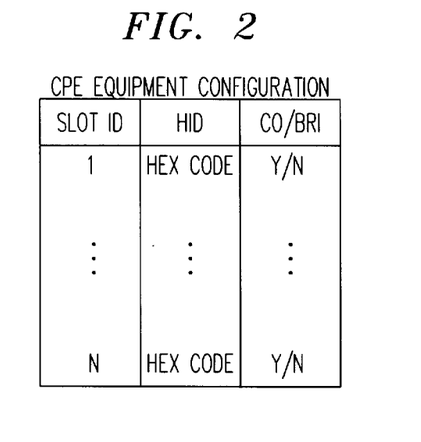
FIG. 2 is a table illustrating a view into the controller's system database showing the data relationships between circuit board slots, hardware identifications (HID) and circuit board type (BRI or not)

FIG. 2 describes the configuration of the CPE and the determination of capability to initiate the BRI provisioning test. The CPE is arranged with N circuit board slot IDs, each of which may contain some facility hardware identified by unique hardware IDs (HID). The order and type of facility hardware contained in a particular slot is flexible. The HID is used to identify that a particular slot contains BRI facility hardware. It is only on this hardware that the BRI provisioning test can be applied.

Figure 3:
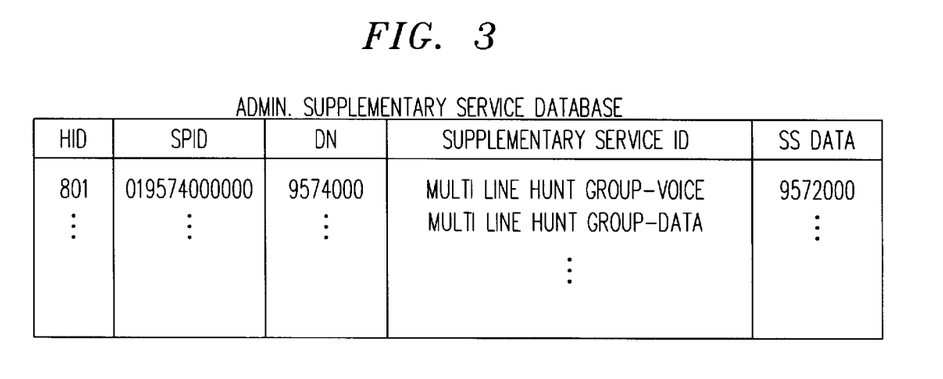
FIG. 3 is a table illustrating a view into the controller's system database showing the data relationships being mapped from each BRI facility to its associated supplementary service.

FIG. 3 is a table illustrating a view into the system database showing the relationship between the Hardware Identifiers (HID), for example, 801, etc., service provider assigned Service Profile Identifiers (SPIDs), for example 019574000000, etc., and the Directory Number (DN) associated with each SPID. In addition, for each DN there is one or more entries defining the Supplementary Services Identifiers (IDs) which are assigned to that particular DN, as well as, a data segment, as appropriate to the given supplementary service, which qualifies or characterizes that supplementary service. By way of examples a number of supplementary service IDs are Multi Line Hunt Group (MLHG)-Voice and Multi Line Hunt Group-Data. Note other call state transitions may result from call control messages as set forth in ITU-T Recommendation Q.931 entitled "Digital Subscriber Signaling System No. 1 (DDSs 1)—ISDN User-Network interface Layer 3 Specification For Basic Call Control", dated March 1993.

Figure 4:
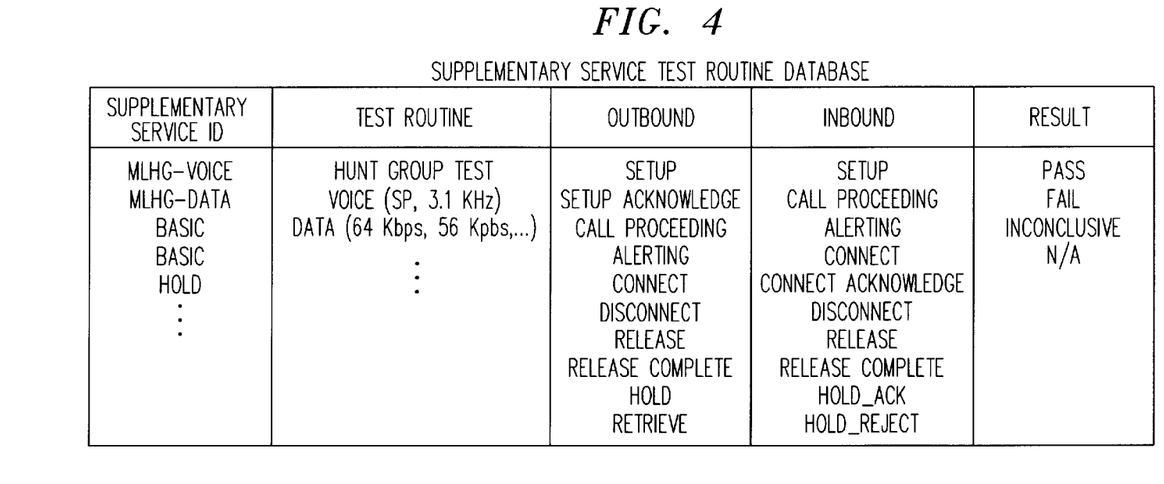
FIG. 4 is a table illustrating a view into the controller's system database.

FIG. 4 describes the internal data store used by the supplementary services test routines. Shown in FIG. 4 are examples of supplementary service IDs, namely, Multi-Line Hunt Group (MLHG)-Voice, MLHG-Data, Basic Voice, Basic Data, Basic and Hold. Several examples of test routines are also shown, namely, Hunt Group Test Voice, Voice (SP, 3.1 kHz), and Data (64 Kbps, 56 Kbps). Each test requires call control messages to be sent between the emulated terminal and the CO. The necessary messages are identified in the database for each test. For each such outbound call, examination is made of proper call state transitions initiated by known call control messages, for example, SETUP, SETUP ACKNOWLEDGE, CALL PROCEEDING, ALERTING, CONNECT, DISCONNECT, RELEASE, RELEASE COMPLETE, HOLD and RETRIEVE. The examination includes an analysis, in which the state transitions caused by the transmitted call control messages are compared to known nominal state transitions expected to be caused by control messages for the test being made. Similarly, for each such inbound call, examination is made of proper call state transitions initiated by known call control messages, for example, SETUP, CALL PROCEEDING, ALERTING, CONNECT, CONNECT ACKNOWLEDGE, DISCONNECT, RELEASE, RELEASE COMPLETE, HOLD ACKNOWLEDGE and HOLD REJECT. Call disestablishment procedures involve proper call state transitions initiated by known call control messages, for example, DISCONNECT, RELEASE, and RELEASE COMPLETE. The database also specifies the appropriate result for each supplementary service test given the message sequence and call state, for example PASS, FAIL, INCONCLUSIVE or NOT APPLICABLE (N/A). Again, the examination includes an analysis, in which the state transitions caused by the transmitted call control messages are compared to known nominal state transitions expected to be caused by control messages for the test being made.

Figure 5:
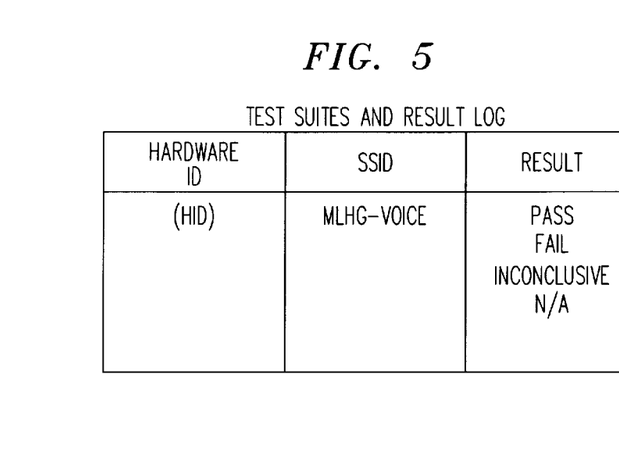
FIG. 5 is a table showing the data relationships being mapped between supplementary services, associated tests, messages and results.

FIG. 5 describes the internal data store used to record the result of each supplementary service test for each hardware ID. Note that in the general case the test result is associated with the combination of hardware ID and DN. The store records the hardware ID, the specific supplementary service test and its result for later retrieval in database 112. The result can be any one of, for example, PASS or FAIL, INCONCLUSIVE and NOT/APPLICABLE (N/A).

Figure 6:
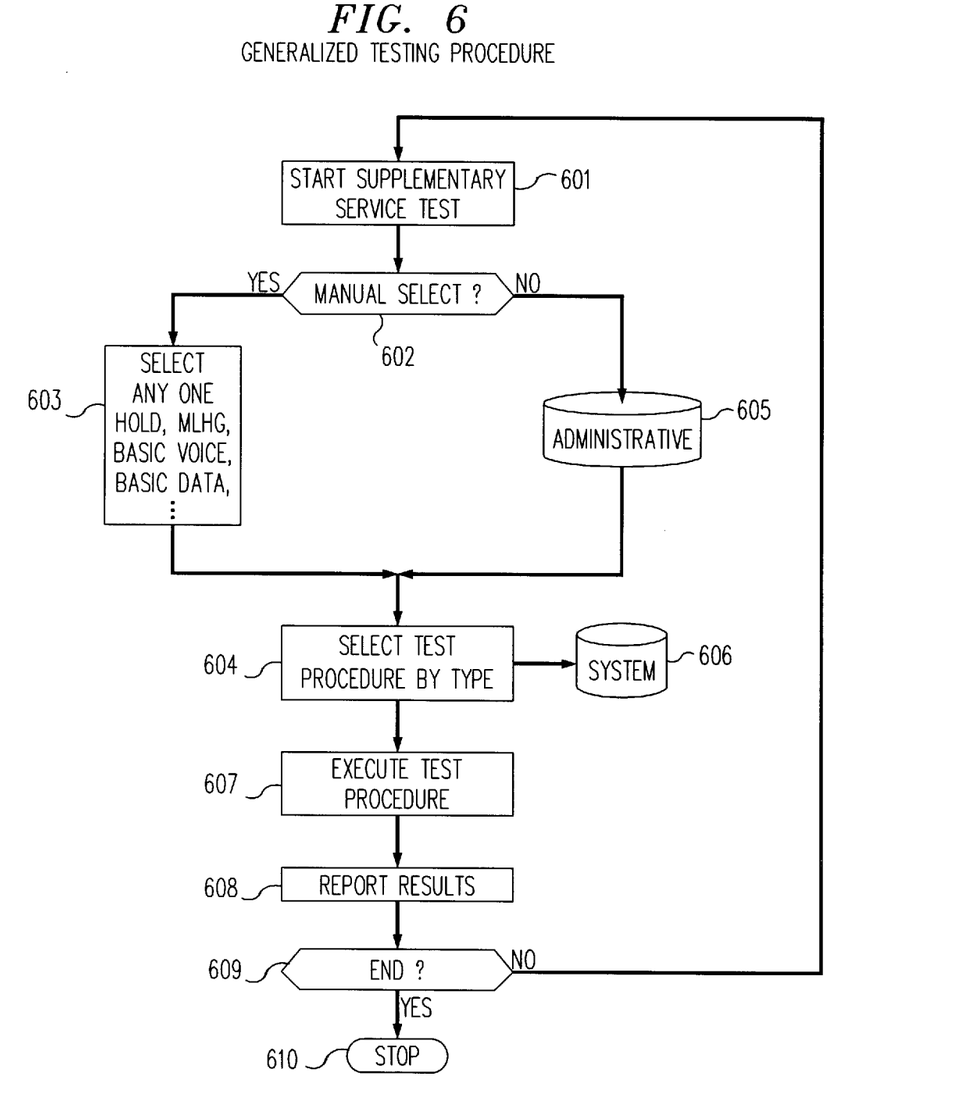
FIG. 6 is a flow chart illustrating the procedures associated with the generalized test procedure.

FIG. 6 depicts, at a high level, the operation of the generalized test procedure. The supplementary service test is started in step 601. Thereafter, step 602 determines if the test is manual or not. If the result in step 602 is YES, the procedure begins by offering the user in step 603 the ability to select either a particular test to be executed, from a list of known tests to the user, who will then select the test to be executed, such as Hold, Multiline Hunt Group (MLHG), Basic Voice, Basic Date, or other tests designed to exercise supplementary services known in the art. If the result in step 602 is NO, an automated scan of the system administrative data base is effected by step 605 which identifies tests to be executed against the supplementary services found therein. After the system has been enabled to execute a test, either manually selected via step 603 or data-driven via step 605, the system will select its test procedure appropriate to the service selected in step 604 and load the appropriate test procedure from the system data store 606. The system will then execute the test procedure in step 607, and then record the results in the reporting subsystem in step 608. The system will then check to see if another test is needed in step 609. If the result in step 609 is NO, another supplementary service test is started in step 601 and steps 601 through 609 are iterated until step 609 yields a YES result and the testing is stopped in step 610.

Figure 7:
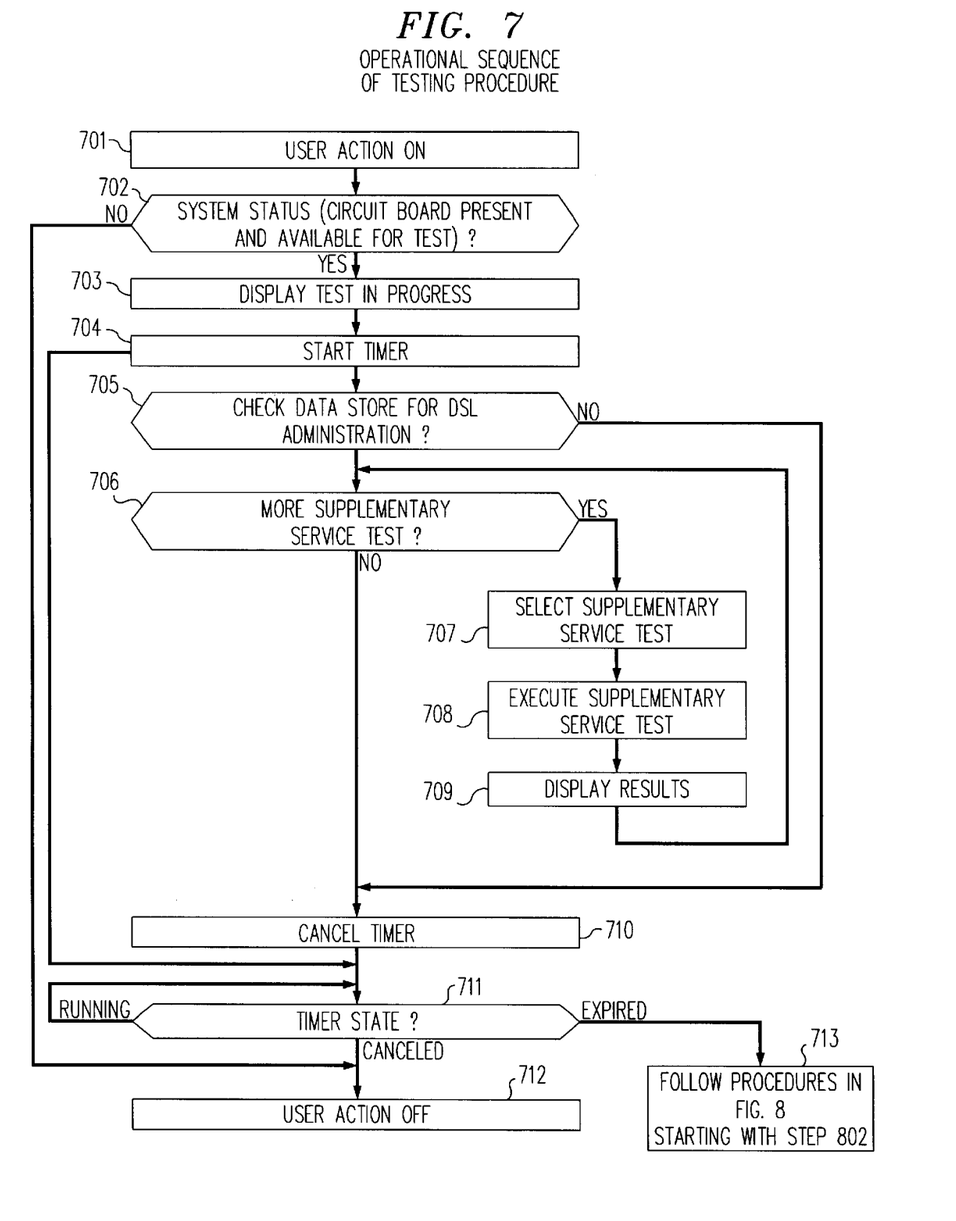
FIG. 7 is a flow chart illustrating the test procedures executed during testing the central office provisioning of supplementary services.
Figure 8:
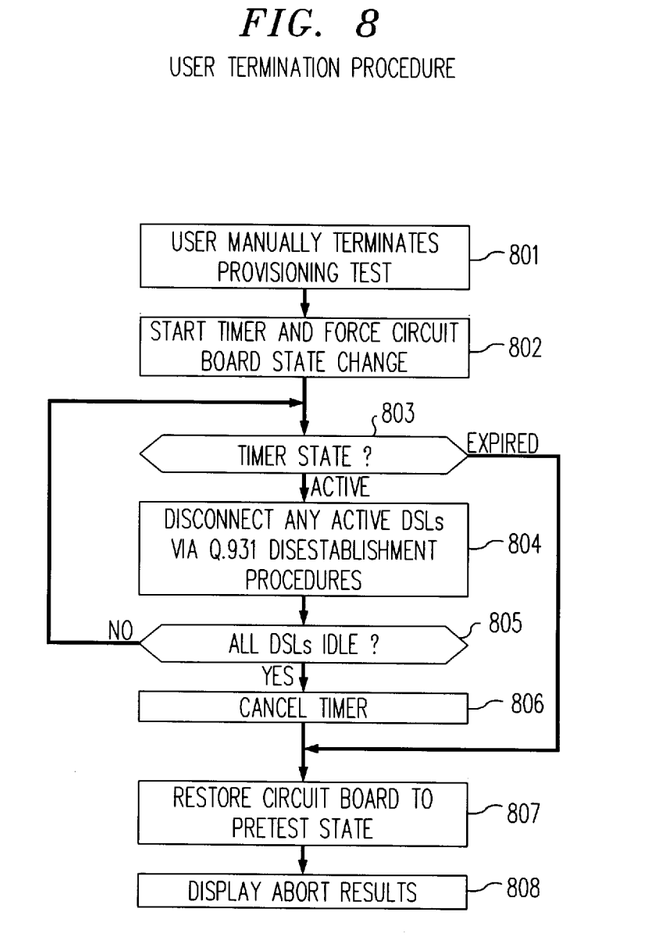
FIG. 8 is a flow chart illustrating the procedures associated with manually aborting a test of the central office provisioning.

FIG. 7 is a flow chart illustrating the test procedures executed during testing the connecting switch provisioning of supplementary services and, thus, is an expansion of step 607 (FIG. 6). As shown, the test procedure begins with a user activating the test subsystem via step 701 at either a local or remote administration or maintenance terminal (118–121 FIG. 1). If the circuit board that has been selected is identified in step 702 in database 112 as a BRI 104 and associated emulated terminals 105, then the tester determines if all the other BRI circuit boards are in the correct state by checking their status in database 112. If the result of the status check in step 702 is NO, the test cannot be initiated and control is transferred to step 712 which causes the user action to be OFF and a message reporting the failure is displayed. If the result of the status check in step 702 is YES, the test can proceed and a message indicating the test is in progress is displayed. A guard timer, started in step 704, runs in parallel to protect against a possible runaway test. The state of the timer is repeatedly checked in step 711. If the timer is canceled, the BRI circuit boards are restored to their pretest state and the test results are displayed. If the test is not completed in the allocated interval of the timer and the timer expired, control is transferred to step 713 and the abort procedure described below in connecting switch conjunction with FIG. 8 is followed beginning with step 802. Returning to step 705, after the circuit board has been determined to be present and ready, the tester checks system database 112 to determine if any of the emulated CO terminals 105 associated with DSLs 101 are administered with a SPID, DN(s), and/or provisioning information as depicted in FIG. 3. Emulated CO terminals 105 are a vehicle for testing their associated BRI lines 104; therefore, BRI lines 104 and their emulated CO terminals 105 may be used interchangeably to identify the supplementary service and facility under test combination. If none of the emulated CO terminals 105 are administered, the provisioning test ends with the appropriate error code for each BRI line; the timer is canceled in step 711, and the results are eventually displayed.

As each administered emulated CO terminal 105 is initialized, it becomes available for testing; testing ends for those BRI lines that fail initialization on layers 1, 2, or 3. Each BRI line can be tested for all possible basic and supplementary services to determine the services that are provisioned on that line. Or to reduce testing effort and time, each BRI line can be additionally administered with provisioning information to inform the tester of the services that will need to be verified on that line. Steps 706 through 709 show the continuous selection of a test, its execution on all applicable BRI lines 104 and the test results in step 709 until the selection procedure indicates to the test procedure in step 706 that testing is complete for the supplementary service under test or the test procedure has executed all possible tests for all supplementary services.

FIG. 8 is a flow chart of the sequence of steps taken in a manual abort, i.e., termination, of the provisioning testing. Note that steps 802 through 808 are also employed in conjunction with step 713 of FIG. 7 in order to terminate the testing when the timing interval set in step 711 has expired. For a manual abort the user terminates the provisioning test in step 801. A guard timer is initiated in step 802 and the system forces the circuit board under test to change its state. Note that this timer is running in parallel with the other steps of this abort procedure. This is illustrated by the path from step 803 to step 807. Step 804 causes disconnects of any active DSLs via the Q.931 disestablishment procedures. Note that the Q.931 standard was cited above. Then a determination is made in step 805 whether all the DSLs are idle. If the test result is NO, control is returned to step 803 and steps 803–805 are iterated until step 805 yields a YES result. Step 806 causes the timer to be canceled. If the timer is either canceled in step 806 or expired in step 803, step 807 causes the circuit board under test to be restored to its pretest state. Thereafter, step 808 displays the abort results.

Figure 9:
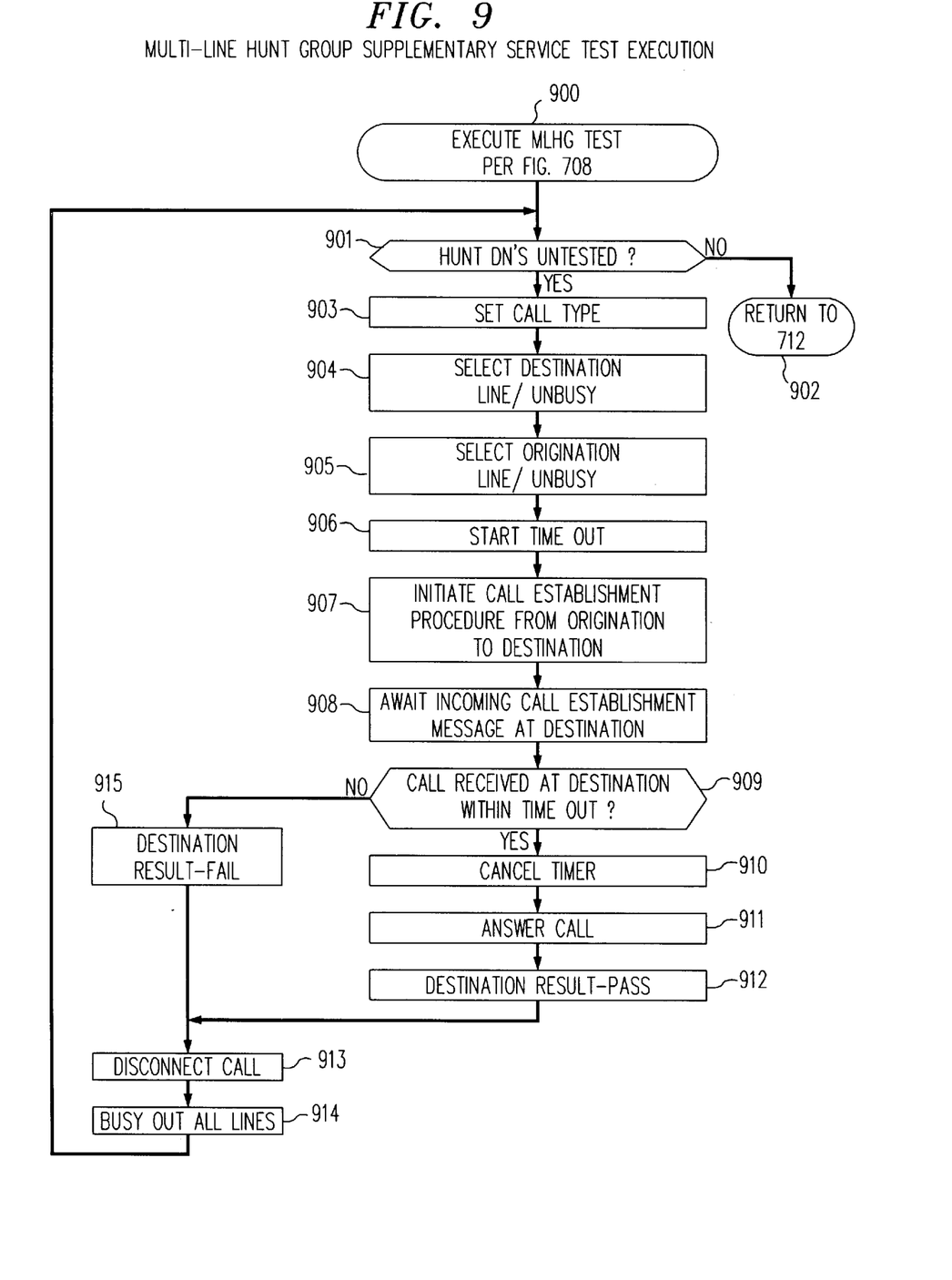
FIG. 9 is a flow chart illustrating the multi-line hunt group supplementary service test execution.

FIG. 9 is a flow chart which depicts the operational sequence of the provisioning test procedure for Multi-Line Hunt Groups (MLHGs). This test requires administration of the hunt Directory Number (HDN) as well as the call type of each hunt group as shown in FIG. 3. This test also requires the availability of other BRI lines capable of making outbound calls of the call types to the BRI line under test for Multi-Line Hunting. The supplementary service test is an expansion of step 708 in FIG. 7. The system checks for untested hunt capable lines in step 901. If the result in step 901 is NO, no such lines exist, control is returned to step 709 in FIG. 7 and the test is terminated. If the result in step 901 is YES, the test procedure begins. Step 903 sets the call type. For each untested HDN administered for the BRI line under test, another BRI line known to be capable of originating a call of the call type of the hunt group associated with the HDN is required. Note, that the term HDN refers to a directory number (DN) or address which is also an address for a Hunt Group. A DSL line is selected for the destination and unbusied in step 904. The origination line is selected and unbusied in step 905. A guard timer is set in step 906 with an interval of time to allow the call to be completed. A call of the selected call type is initiated via step 907 on the originating line using the HDN as the destination address, i.e., the selected destination line in step 904. Then, the incoming call establishment is awaited at the destination in step 908. Thereafter, step 909 tests to determine whether the call was received at the destination within the time out of the timer set in step 906. If the call arrives at the destination line within the time-out, the timer is canceled in step 910 and the call is answered in step 911. Note that the test procedure may transmit a bit pattern to validate end-to-end integrity of the communication link. Then, the result is set to pass in step 912. Thereafter, control is transferred to step 913 and the call is disconnected. If the call does not arrive before the time-out of the timer set in step 906, or if disestablishment procedures are initiated on the originating call by the serving connecting switch, the test fails for the destination address for the hunt group of the HDN and call type, i.e., the call was not received at the destination during the time out interval the test result in step 909 is NO, and control is transferred to step 915 which indicated that the destination result is fail. Then, the call is disconnected via step 913. The originating and destination lines are busied via step 914. The unpredictability of testing with Multi-Line Hunt lines is managed by keeping lines that are not under test in a busied state. Thereafter, control is returned to step 901 and the procedure is iterated until step 901 yields a NO result.

Figure 10:
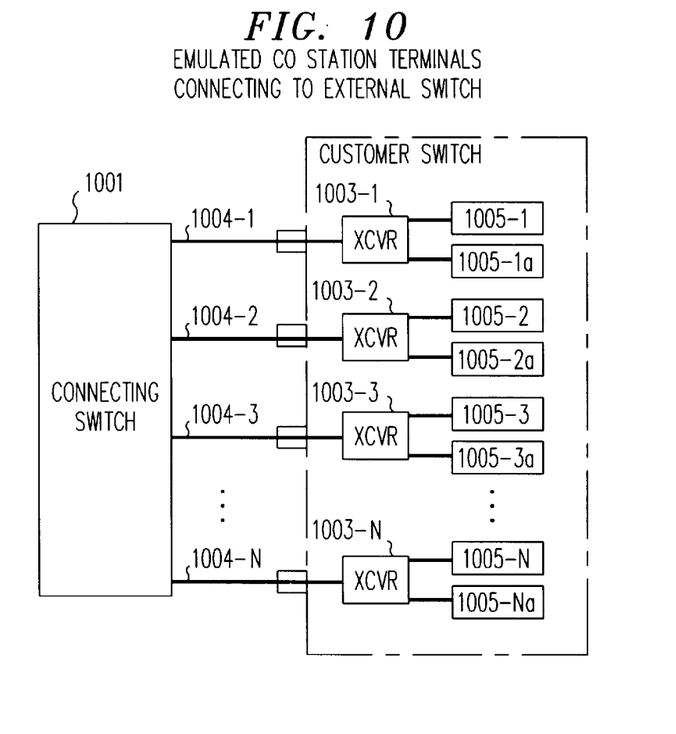
FIG. 10 illustrates the connection of emulated central office station terminals in a customer switch to the central office switch.

FIG. 10 is a block diagram depicting the connection of a customer switch 1002 to a connecting switch 1001 via a plurality of DSL's 1004 interfacing a similar plurality of transceivers (XCVRs) 1003 resident on the customer switch. Software emulated connecting switch terminals 1005, resident in the customer switch, are connected to a transceiver via a passive bus.

Figure 11:
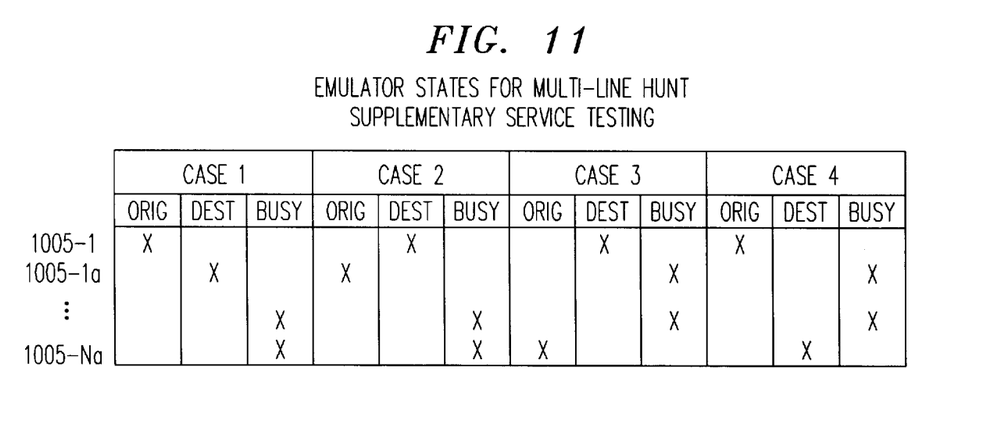
FIG. 11 shows a table that illustrates the necessity of "busying out" emulated central office emulated terminals not included in the multi-line hunt testing of the emulated terminals.

FIG. 11 shows on a case-by-case basis that whether the selected origination and destination reside on the same DSL (cases 1 and 2) or different DSLs (cases 3 and 4), it is necessary when testing with Multi-Line Hunt lines to busy the remaining lines that are not under test to ensure that the call does arrive at the destination, since the other lines are not available to receive calls.

Figure 12:
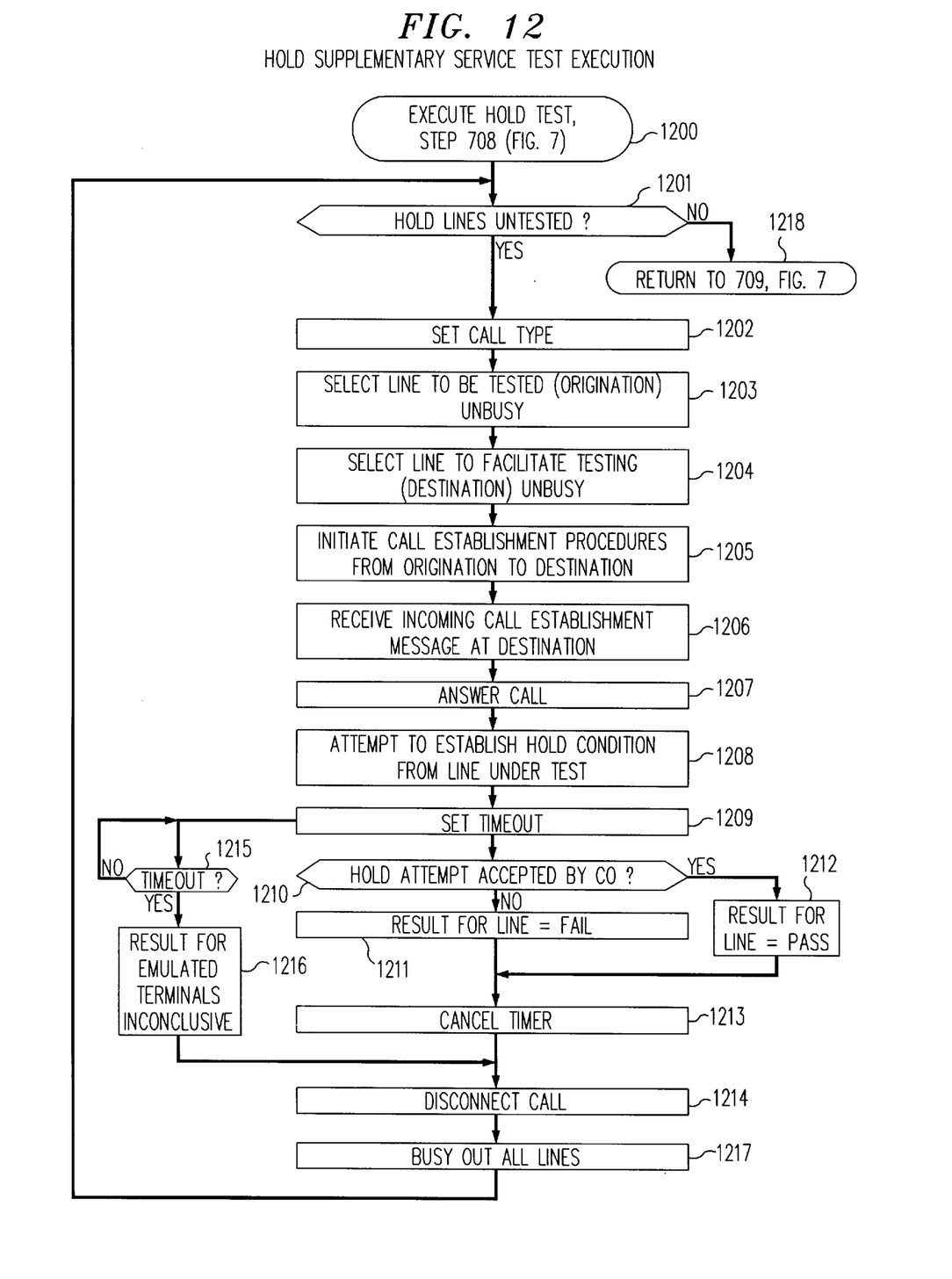
FIG. 12 is a flow chart illustrating the procedures associated with the execution of a hold supplementary service test procedure.

FIG. 12 is a flow chart which depicts the operational sequence of the Hold Supplementary Service Test Procedure. This flow chart is an example of an expansion of step 708, Execute Supplementary Service Test, in FIG. 7. As shown, the test procedure begins via step 1200 after this supplementary service has been selected for testing. Step 1201 verifies that emulated connecting switch station terminal 105 exists for which the Hold Supplementary Service Testing can be performed as identified by the database 112 as indicated in FIG. 4, and which have not yet been tested for the Hold Supplementary Service but which have been previously verified to function correctly for Basic service testing in FIG. 5. If such an emulated connecting switch station terminal 105(FIG. 1) that satisfies the criteria exists and another emulated connecting switch station terminal 105 exists which can be used to complete the call, the Hold Supplementary Service Test can be executed. If the result in step 1201 is YES, in step 1202, the call type appropriate for this Hold Supplementary Service Test is determined from the database shown in FIG. 4. In steps 1203 and 1204, both the emulated connecting switch station terminal 105 under test and the emulated connecting switch station terminal 105 selected to facilitate this test are unbusied. One of the emulated connecting switch station terminal 105 will be designated the originator, and the other will be designated the destination. In step 1205, the originating emulated connecting switch station terminal 105 will initiate call establishment procedures to the destination emulated connecting switch station terminal 105 by exchanging call control messages to the connecting switch. In step 1206, the connecting switch notifies the destination emulated connecting switch station terminal 105 of an incoming call. The destination emulated connecting switch station terminal 105 connects the call in step 1207. In step 1208, the emulated connecting switch station terminal 105 under test attempts to activate the HOLD feature by sending a HOLD message to the CO. In step 1209, a guard timer is started in parallel to prevent the tester from waiting indefinitely if the connecting switch does not respond. In step 1210, the connecting switch has either accepted or rejected the HOLD request which causes a pass or failure to be recorded in steps 1212 or 1211, respectively, in database 112. The timer is canceled in step 1213, and call disestablishment procedures are initiated to disconnect the call in step 1214. However, if the timing expires in step 1215, the result for the test is inconclusive as indicated in step 1216 and call disestablishment procedures are initiated via step 1214 to disconnect the call. Thereafter, all lines are busied out via step 1217. If there are more lines to be tested for the Hold Supplementary Service, control returns to step 1201. Otherwise, control returns to step 709 in FIG. 7 to determine if other supplementary services require testing.

Figure 13:
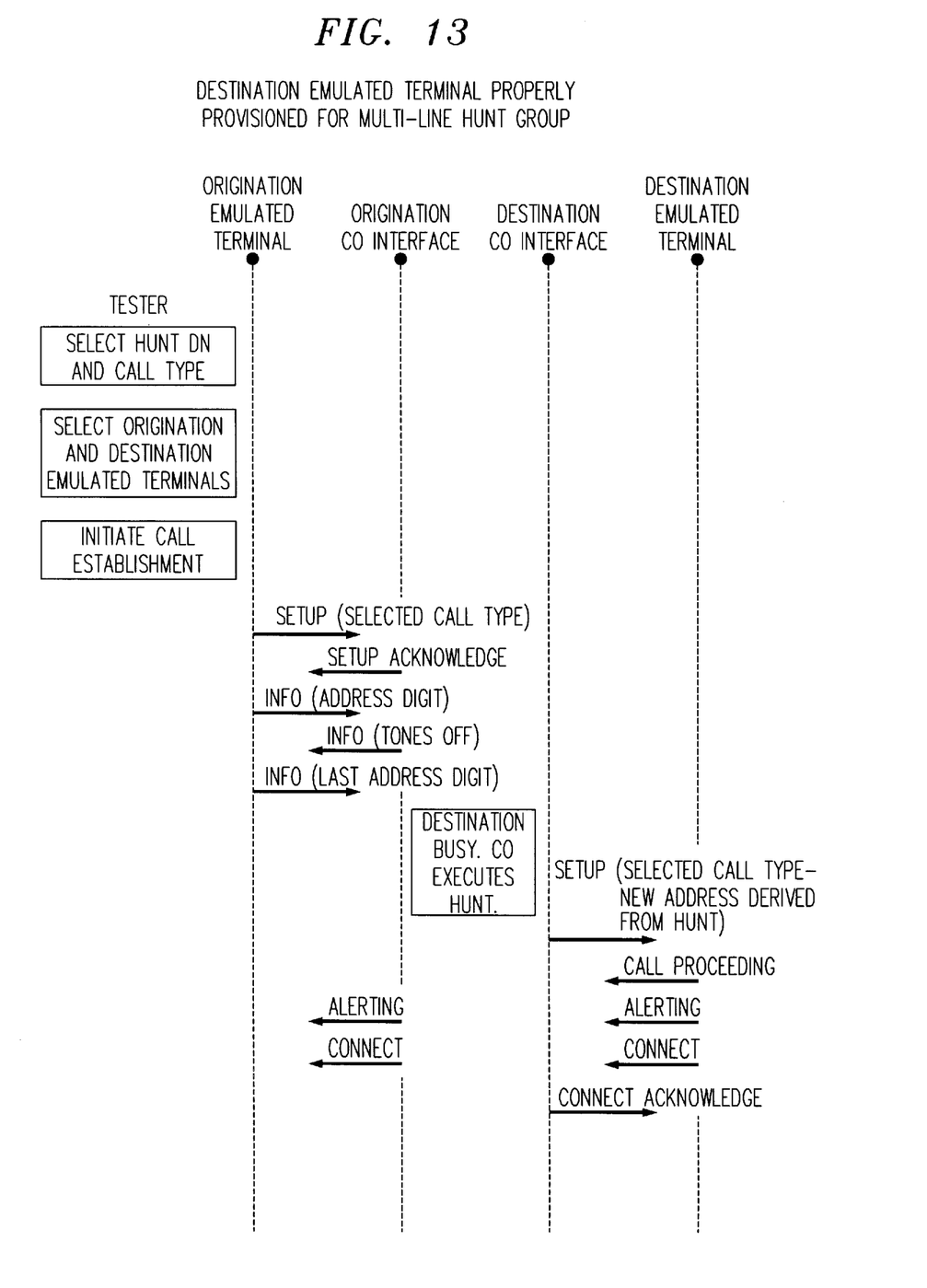
FIG. 13 illustrates a test scenario for an emulated central office station terminal that is properly provisioned for multi-line hunting.

FIG. 13 illustrates a sequence of messages which occur upon initiation of the provisioning subtest for Multi-Line Hunt Groups as set forth in FIG. 9 above for the situation in which the destination emulated terminals are properly provisioned. The hunt DN and call type to be tested are selected. The appropriate origination and destination emulated terminals for the call type are then selected and unbusied before call establishment procedures are initiated from the terminal. As shown, a SETUP message for the call type is sent from the origination emulated terminal. In response thereto the connecting switch 100 (FIG. 1) sends back a SETUP ACKNOWLEDGE message. Next, the origination emulated terminal sends an INFORMATION message including the first address digit to the connecting switch. In response thereto the connecting switch supplies an INFORMATION message indicating that dial tone is off to the origination emulated terminal. Then, the origination emulated terminal sends INFORMATION messages including the remaining address digits of the hunt DN. In response thereto, the connecting switch sends a CALL PROCEEDING message to the origination emulated terminal upon receiving the last address digit. Thereafter, the destination connecting switch, recognizing that the destination terminal is both a member of a MLHG and busy, redirects the call to the next non-busy member of the hunt group which is the actual test target of the call by sending a SETUP message to the new destination. In response thereto the destination emulated terminal sends a CALL PROCEEDING message to the destination connecting switch. Then, the destination emulated terminal sends an ALERTING message to the destination connecting switch which is propagated to the origination connecting switch which, in turn, sends it to the origination emulated terminal. Thereafter, the destination emulated terminal sends a CONNECT message to the destination connecting switch which is propagated to the origination connecting switch and then to the origination emulated terminal. Upon the call being completed, the destination central office sends a CONNECT ACKNOWLEDGE message to the destination emulated terminal.

Figure 14:
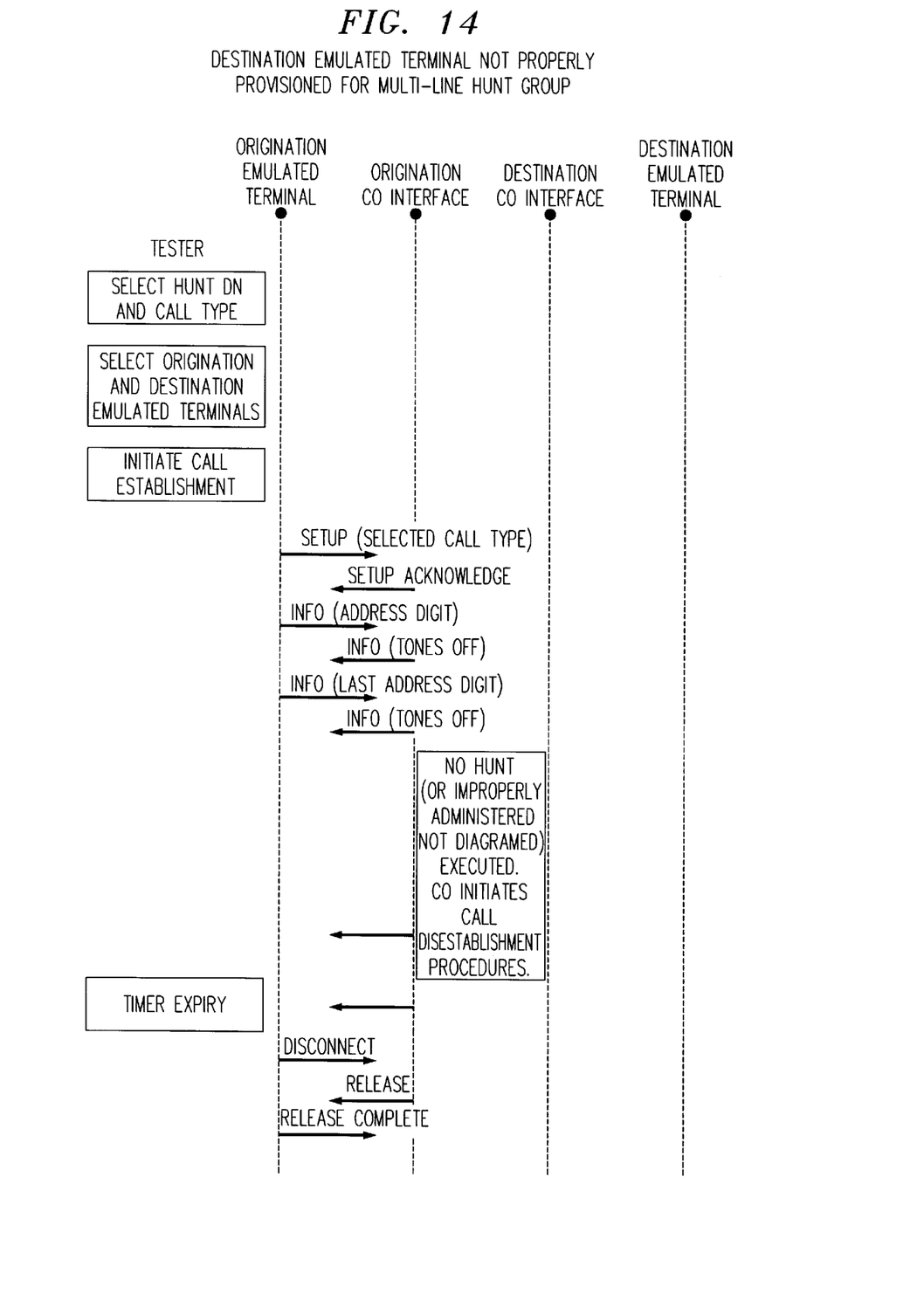
FIG. 14 illustrates a test scenario for an emulated central office station terminal that is not properly provisioned for multi-line hunting.

FIG. 14 illustrates a sequence of messages which occur upon initiation of the provisioning subtest for Multi-Line Hunt Groups as set forth in FIG. 9 above for the situation in which the destination emulated connecting switch station terminal is not properly provisioned for hunting. The hunt DN and call type to be tested are selected. The appropriate origination and destination emulated terminals for the call type are then selected and unbusied before call establishment. As shown, a SETUP message for the call type is sent from the origination emulated terminal. In response thereto the connecting switch sends back a SETUP ACKNOWLEDGE message. Next, the origination emulated terminal sends an INFORMATION message including the first address digit to the connecting switch. In response thereto, the connecting switch supplies an INFORMATION message indicating that dial tone is off to the origination emulated terminal. Then, the origination emulated terminal sends INFORMATION messages including the remaining address digits of the hunt DN. Because the destination emulated connecting switch station terminal is not properly provisioned for hunting, no hunt will result and no SETUP message will be sent from the destination connecting switch. Instead, the destination connecting switch will notify the origination connecting switch of the busy condition of the destination emulation connecting switch station terminal. Subsequently, the origination connecting switch return a "busy signal" to the originator. Upon the timer expiring, the test system logs an error condition and initiates call disestablishment procedures at the originating connecting switch emulated terminal via a DISCONNECT message. The connecting switch returns a standard RELEASE message which causes the test system to complete the disestablishment procedure with a RELEASE COMPLETE message. Note that the originating connecting switch provides a far end busy indication which can be used to indicate the error and start disestablishment procedure (not shown).

Additionally, it should be noted that it will be apparent to those skilled in the art that the test system can be implemented in a DSP or microprocessor via software, VLSI, or a combination of both.

What is claimed:

1. Premises switching apparatus for use in testing if a supplementary service has been correctly administered on a given subscriber line comprising:
    means for generating call control messages for the service being tested;
    means for transmitting the generated call control messages to a connecting switch;
    said call control messages causing initiation of call state transitions; and
    analysis means for comparing call state transitions initiated by the transmitted call control messages to predetermined nominal call state transitions for the supplementary service being tested to determine if the supplementary service has been correctly administered by the connecting switch for the given subscriber line.

2. Premises switching apparatus as defined in claim 1 wherein said test of the connecting switch administration is done on a directory number basis, said directory number identifying at least one emulated station terminal.

3. Premises switching apparatus as defined in claim 1 further including means for storing and for algorithmically selecting the supplementary service test routines, and means for analyzing the results achieved against expected nominal performance.

4. Premises switching apparatus as defined in claim 1 further including means for reporting results of said supplementary service test.

5. Premises switching apparatus as defined in claim 4 further including means for terminating the supplementary service test.

6. The invention as defined in claim 1 wherein said customer premises switching apparatus further includes means for testing to determine whether prescribed basic services have been properly administered.

7. A method for use in premises switching apparatus for testing if a supplementary service has been correctly administered on a given subscriber line comprising the steps of:
    generating call control messages for the service being tested;
    transmitting the generated call control messages to a connecting switch;
    said call control messages causing initiation of call state transitions; and
    analyzing call state transitions initiated by the transmitted call control messages as compared to predetermined nominal call state transitions for the supplementary service being tested to determine if the supplementary service has been correctly administered by the connecting switch for the given subscriber line.

8. The method as defined in claim 7 wherein said test of the connecting switch administration is done on a directory number basis, said directory number identifying at least one emulated station terminal.

9. The method as defined in claim 7 further including the steps of storing and algorithmically selecting the supplementary service test routines, and analyzing the results achieved against expected nominal performance.

10. The method as defined in claim 7 further including the step of reporting results of said supplementary service test.

11. The method as defined in claim 10 further including the step of terminating the supplementary service test.

12. The method as defined in claim 7 further including the step of testing to determine whether prescribed basic services have been properly administered.

13. Premises switching apparatus for use in testing if a supplementary service has been correctly administered on a given subscriber line comprising:
    a generator for generating call control messages for the service being tested;
    a transmitter for transmitting the generated call control messages to a connecting switch;
    said call control messages causing initiation of call state transitions; and
    a comparator for comparing call state transitions initiated by the transmitted call control messages to predetermined nominal call state transitions for the supplementary service being tested to determine if the supplementary service has correctly been administered by the connecting switch for the given subscriber line.

14. Premises switching apparatus as defined in claim 13 wherein said test of the connecting switch administration is done on a directory number basis, said directory number identifying at least one emulated station terminal.

15. Premises switching apparatus as defined in claim 13 further including a storage element for storing and a control element for algorithmically selecting the supplementary service test routines, and an analysis element for comparing the results achieved against expected nominal performance.

16. Premises switching apparatus as defined in claim 13 further including apparatus for reporting results of said supplementary service test.

17. Premises switching apparatus as defined in claim 16 further including apparatus for terminating the supplementary service test.

18. The invention as defined in claim 13 wherein said customer premises switching apparatus further includes apparatus for testing to determine whether prescribed basic services have been properly administered.

* * * * *